May 23, 1967 R. A. ZRYD ET AL 3,321,581

VOICE OPERATED GAIN ADJUSTING DEVICE

Filed July 5, 1963 3 Sheets-Sheet 1

INVENTORS
R. A. ZRYD · J. M. GODFREY
BY
Paull Hemminger
ATTORNEY

May 23, 1967 R. A. ZRYD ET AL 3,321,581

VOICE OPERATED GAIN ADJUSTING DEVICE

Filed July 5, 1963 3 Sheets-Sheet 2

VOICE OPERATED GAIN ADJUSTING DEVICE

Filed July 5, 1963 3 Sheets-Sheet 3

United States Patent Office 3,321,581
Patented May 23, 1967

3,321,581
VOICE OPERATED GAIN ADJUSTING DEVICE

Rudolf A. Zryd, Sunnyvale, and John M. Godfrey, Los Altos, Calif., assignors to International Telephone and Telegraph Corporation, New York, N.Y., a corporation of Maryland Filed July 5, 1963, Ser. No. 293,027
17 Claims. (Cl. 179—1)

This invention relates in general to automatic gain control circuits and in particular to an amplifying device in which the gain thereof is automatically and rapidly controlled by voice signals passing therethrough.

In voice transmission systems, such as used in long-distance carrier telephony and mobile radio telephony, for example, wide variations exist in the input speech levels used to modulate the transmitter equipment. These speech level variations arise since the telephone subscriber sets are connected to the transmitting equipment over lines of various lengths and resistances and since speech volumes of different speakers vary. In order to preclude the varying levels of these speech signals which are used to modulate the carrier eaves, from adversely affecting associated transmitter equipment, it is imperative that the level of the modulating signals be relatively constant. Thus, gain control equipment is required which can increase or decrease the amplitude of speech signals to provide the noted constant level. Such gain control equipment must also provide effective rejection and non-amplification of noise interference and provide substantially complete suppression of syllabic-modulated background signals during conversation. Further, the gain control equipment must be arranged to provide gain control only when speech signals are present.

A problem present in gain controlling equipment of the above character arises during pauses in speech, especially under presence of syllabic modulated background noise, e.g., background speech. Under these conditions, (a) the equipment automatically increases the gain until the background noise reaches nominal output volume, unless (b) the gain increase performance is relatively slow. In case (a), however, if the original subscriber resumes talking, the strong speech signals receive a high gain until the equipment recovers. In the latter case, however, the gain increase action of the device is slow in general and might result in a loss of information at the beginning of a low level conversation.

Accordingly, it is an object of this invention to provide a gain controlling equipment which delays the gain increaser action proportionally to the amount of a sudden drop in input level. Thus, for a small drop in input level a short recovery time to adjust to the proper output volume is achieved, whereas, for a large drop in input level (e.g., between a strong talker and background noise) a delay time is added. Note that this delay is not applicable at the beginning of a conversation at low levels, so that no delay occurs in gain increaser action for a weak talker. This feature effectively reduces interference of syllabic modulated background noise during a conversation, whereby, fast regulation is still maintained to compensate for normal variation in speech levels.

Another of the problems existing in speech-controlled automatic gain-adjusting equipment is distinguishing between speech signals and noise signals simulating speech. While known systems analyze the syllabic content of the arriving signals only, the new equipment under reference evaluates first the difference in ratio of R.M.S. to peak power as an additional criterion to recognize speech. The modified signal is then passed on the actual speech recognition circuit.

Accordingly, another subject of the present invention is to further preclude erroneous operation of the gain controlling equipment by spurious noise signals. This is accomplished by providing a unique speech slicing and selecting circuit in addition to the actual speech recognition circuit.

A reliable method of controlling the amplitude of speech signals is to utilize a variable-loss device, commonly known as a variolosser, in series with the transmission path. These devices include diode-controlled resistance pads, the overall value of which is varied as a function of the direct-current flowing through the diodes. The amplitude of the speech signals is detected in associated control equipment and a control current is fed to the variolosser to increase or decrease the resistance of the pads to control the amplitude of the speech signals passing therethrough. One disadvantage of the variolossers used in this manner is that both signal currents and control currents are present in the transmission path and signal distortion may readily occur. Accordingly, another object of this invention is to provide a variable-loss device in the voice transmission path which isolates the control currents from the signal currents and thus provides purity of amplitude increase or decrease.

A feature present in carrying out the above object resides in an arrangement using photo-lamp cells as the resistance pads and controlling the resistance of the cells by varying the current supplied to their filaments.

Still another feature resides in the arrangement wherein the value of the current fed to the filament is controlled by a gating circuit which responds substantially instantaneously to control signals derived from an analysis of the output signals.

Other features relate to the switching arrangement in the noted gating circuit for insuring that gain increase action occurs only where speech signals are present.

Other objects and features relate to the provision of a unique voltage doubler and rectifier, and to the provision of a low cost reliable gain-controlling device which requires a minimum of maintenance and repair of controlled circuits.

Still other objects and features of the invention will become apparent and the invention will be best understood when the specification is read in conjunction with the accompanying drawings comprising FIGS. 1 to 4 in which.

Figure 1:
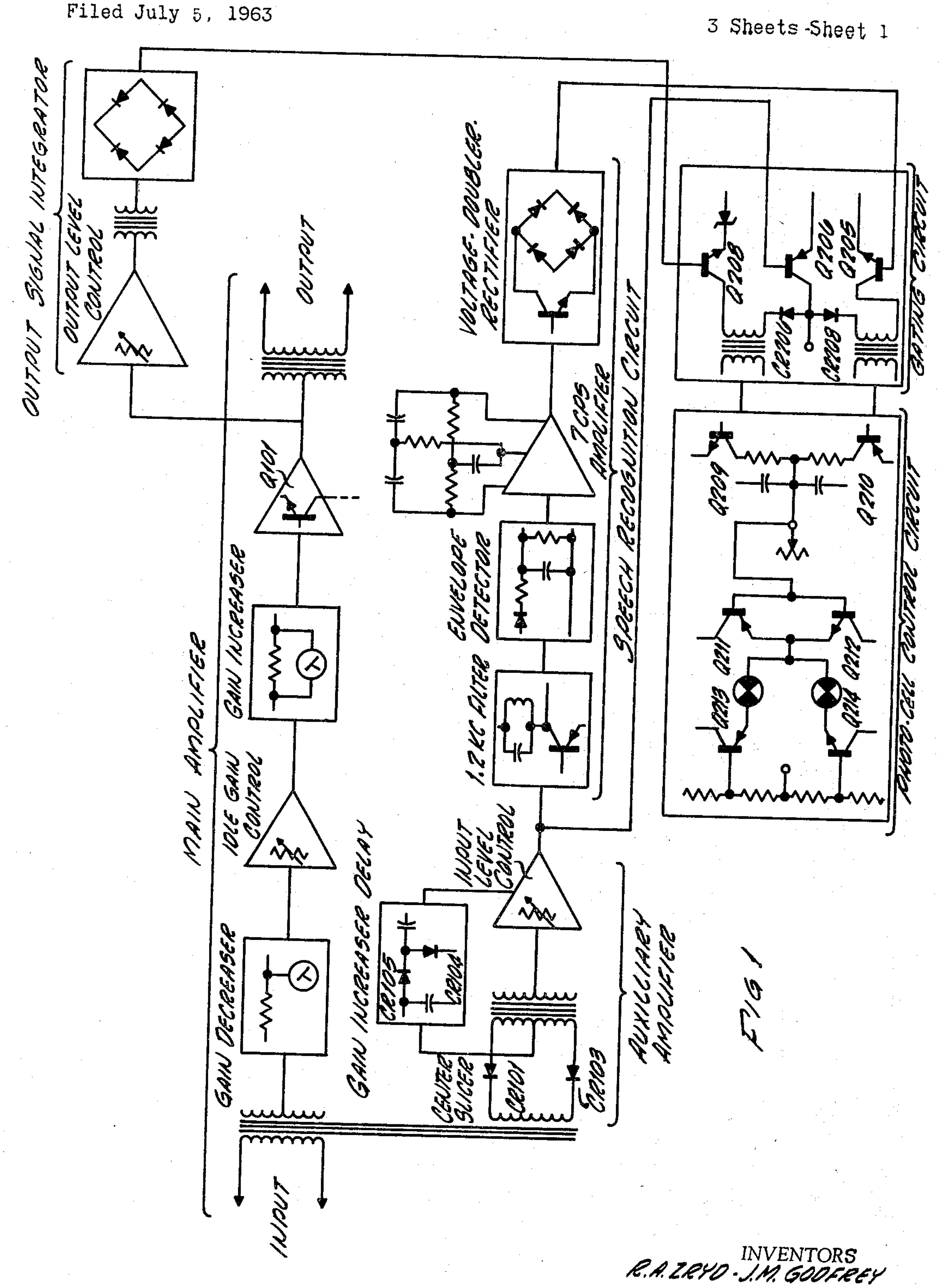
FIG. 1 shows a simplified block program and partial schematic representation of the voice operated gain adjusting device of the invention.

Referring now to FIG. 1 of the drawings, a brief description will be given of the operation of each of the stages in controlling the gain of speech signals passing from the input transformer to the output transformer.

The voice operated gain adjusting device includes the following main stages.

(a) *The main amplifier* (Q101, Q102, Q105, Q106).—This section provides the actual gain for the speech signals and contains two variable-resistance lamp-photocell combinations as gain-controlling elements. The input and the output consists of balanced transformers which offer a terminating impedance of 600 ohms.

(b) *The auxiliary amplifier* (Q103, Q104).—The auxiliary amplifier is connected with its input in parallel to the main amplifier through a center slicer (CR101, CR103). Its purpose is to amplify the syllabic modulation of the input signal which controls the speech recognition circuit. The amount of slicing is controlled from the output signal of the auxiliary amplifier through a gain increase delay circuit, which consists of a voltage-doubler rectifier arrangement using diode CR104 and CR105.

(c) *The output signal integrator* (Q108).—This section of the circuit takes a portion of the output signal and performs a short-term integration. Its direct current output is passed to the control circuit to control the gain-decrease gate Q108 therein.

(d) *Overload detector* (Q107).—An overload detector is connected to the output transistor (Q106) of the main amplifier. Upon overload a direct signal effects fast gain decrease action.

(e) *The speech recognition circuit* (Q201, Q202, Q203, Q204).—The speech recognition circuit is divided into four parts, namely, a 1.2 kc. filter, an envelope detector, a selective 7 c.p.s. amplifier and an amplifier output rectifier which drives the gain-increaser (Q205) gate.

The purpose of the speech recognition circuit is to make sure that only speech signals above a certain input level effect gain increaser action, whereas interference signals such as noise, cross-talk and the like are rejected.

The circuit first investigates the 1.2 kc. content of the input signals and secondly checks the syllabic modulation thereof in the envelope detector. If the modulation occurs about at a rate of 7 c.p.s. it is amplified in the selective 7 c.p.s. amplifier and fed to an output rectifier, which controls the operation of the increaser gate Q205 of the gating circuit.

(f) *The gating circuit* (Q205, Q206, Q208).—The gating circuit receives its information from three sources; the speech recognition circuit, the output signal integrator and the output of the auxiliary amplifier. For each of these criteria, a gating transistor is assigned, that is, the increaser gate Q205, the decreaser gate Q208 and the signal gate Q206.

The increaser and decreaser gates are direct-current operated, whereas the signal gate is operated by alternating current signals. Furthermore, there is provided diode switches CR206 and CR208 which give the decreaser gate Q208 priority over the increaser gate (Q205). In order to pass the proper control signals to the photo-cell control circuit, either the increaser gate and/or the decreaser gate in addition to the signal gate must be operated. The two direct-current operated gates essentially determine the function to be performed (increase or decrease), whereas the signal gate initiates the execution by sending alternating current pulses through the corresponding transformer to the associated keying transistor of the control circuit.

(g) *The photo-cel circuit* (Q202, Q210, Q211, Q212, Q213, Q214).—The task of the photo-cell control circuit is to selectively operate the lamps of the lamp-photo-cell combinations and thus to control the overall gain of the main amplifier.

Essentially the photo-cell control circuit consists of the two keying transistors (Q209, Q210) and a transistor hybrid arrangement Q211, Q212, Q213, Q214) with the control lamps in the center branch. Normally, the hybrid is balanced and neither of the lamps is lit.

During speech operation the gating circuit delivers pulses to one of the two keying transistors, which pulses are integrated by the "hang-on" capacitors (224, 226). According to the particular one of keying transistors actuated, the control potential at the transistor hybrid will move more negative or positive and thus turn-on one of the two lamps. It is to be noted that only one of the two lamps can be operated at any one time.

Upon interruption of the input signal the control potential of the transistor hybrid will move back only slowly to the idle balanced position due to the time delay of the noted "hang-on" capacitors.

In case the main amplifier is strongly overloaded, the overload detector feeds a current directly to the decrease keying transistor, which in turn rapidly discharges the "hang-on" capacitors. This results in a fast decrease in overall gain.

Figure 2:
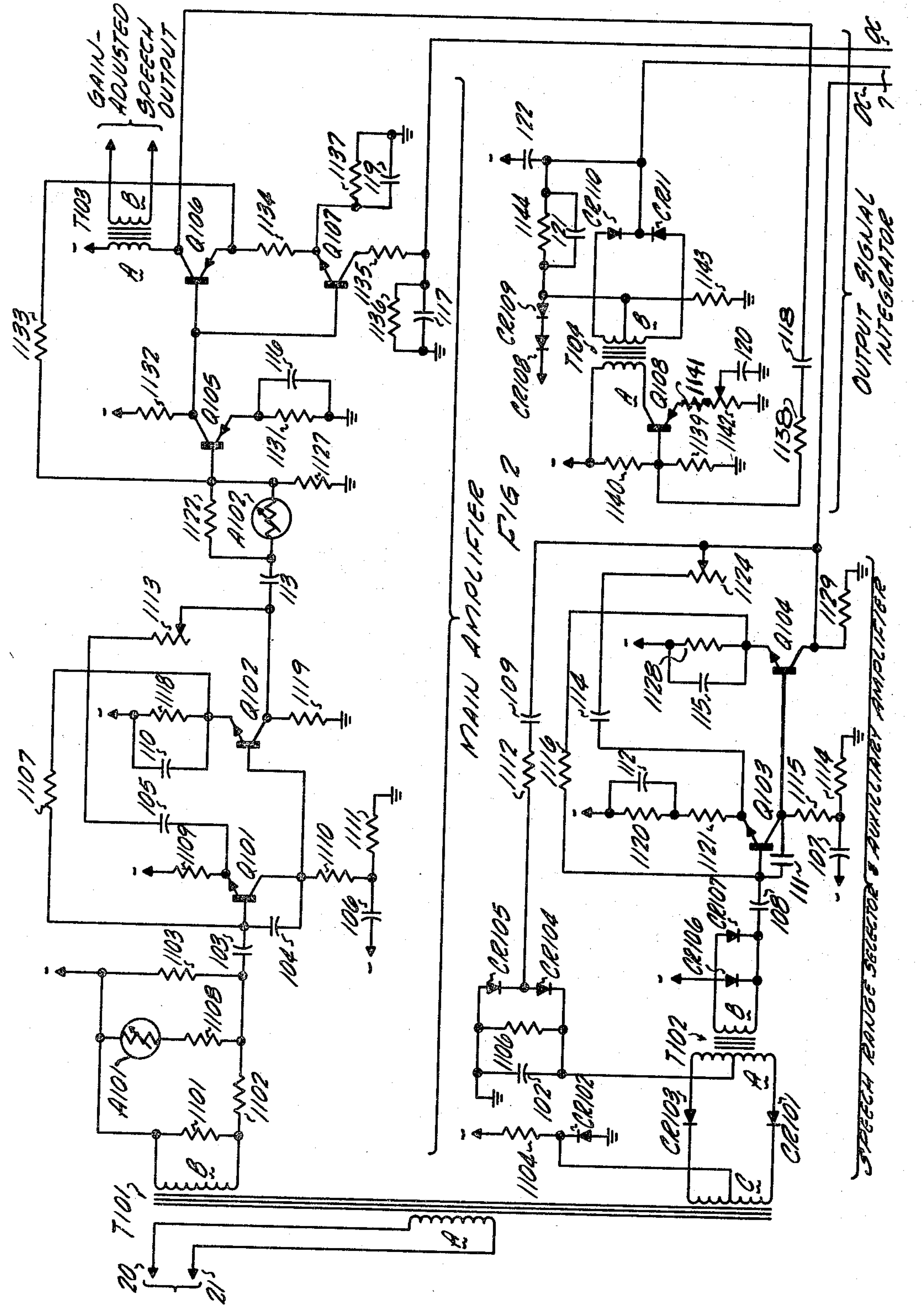
FIGS. 2 and 3 show schematic circuit diagrams of the inventive device of FIG. 1.

Referring now to FIG. 2 of the drawings, a detailed description of the main portion of the voice-operated gain adjusting device will be described.

The main amplifier provides the actual gain for the speech path and contains the gain controlling lamp-photocell combinations. In idle condition both lamps are extinguished and therefore, the photocells are in their high impedance state. The gain decreaser is connected as a shunt element to the input, whereas the gain increaser is connected as a series element between the second and third stage of the main amplifier. An idle gain adjustment is provided in the feedback loop of the first two stages to set the overall idle gain to 28.5 db.

The dynamic gain is automatically adjusted by the control circuit, whereby one of the two lamps is sufficiently lit in order to establish a constant output level of +2 VU. If operated, the gain decreaser is in a position to add up to 20 db loss to the input circuit, whereas the gain increaser can gradually reduce its initial loss by 20 db. It is important to note, that only one of the two lamps can be energized at a time, which always gives the main amplifier a definite state of operation, namely: increased gain, decreased gain or idle gain.

The input and output to the device are completely isolated through transformers and offer a terminating impedance of 600 ohms. A maximum peak power of 15 dbm. can be obtained at the output and for higher levels symmetrical clipping occurs.

Terminals 20 and 21 are the input of the voice operated gain adjusting device which is connected directly to winding A of transformer T101. Transformer T101 has two secondary windings, namely, winding B connected to the input of the main amplifier and winding C which is part of the center-slicer to be discussed later.

Resistance 1101 reflects a 600-ohm impedance to the input of the voice operated gain adjusting device.

Resistance 1102 and the lamp-photocell combination A101 form a variable L-attenuator network. The gain decreaser resistance 1103 sets the idle loss of the network, whereas resistance 1108 sets the maximum loss. The range of gain decrease is approximately 25 db. The photocell lamp combinations are controlled from the control circuit by filaments A101 and A102 shown in FIG. 3.

The first two stages of the main amplifier consist of transistors Q101 and Q102 and their associated components. These two stages are direct-current coupled and stabilized through two separate negative feedback loops. Direct-current stabilization is provided from the emitter of transistor Q102 through resistance 1107 to the base of transistor Q101. The same path also provides a biasing current for the input stage. Alternating-current feedback is furnished from the collector of transistor Q102 through resistance 1113 and capacitance 105 to the emitter resistor 1109 of transistor Q101. This feedback, which is variable under control resistance 1113, sets the idle gain and increases the input impedance of the amplifier for proper matching to the high impedance photocell. Capacitor 103 interconnects the gain decreaser network to the amplifier and shapes the frequency response below 300 c.p.s.

Resistor 1110 is the collector resistor of transistor Q101 and resistance 1111 and capacitance 106 form a RC-filter to prevent undesired feedback through the power regulator. Capacitance 104 prevents oscillation at high frequencies and shapes the frequency response above 3K c.p.s. Resistance 1118 biases the emitter of transistor Q102 whereas resistance 1119 biases its collector.

Capacitance 113 couples the first two stages of the main amplifier to the gain increaser network which consists of resistance 1122, photocell A102 and the input impedance of Q105. In contrast to the gain decreaser network, the gain increaser network forms a L-structure with the lamp-photocell combination as variable elements in the series branch. Resistance 1122, in conjunction with the input impedance of transistor Q105 provides the idle loss. Upon operation of the lamp-photocell combination, the idle loss can be reduced by approximately 25 db which accordingly results in an overall gain increase of the main amplifier.

Transistors Q105 and Q106 make up the second half of the main amplifier. Resistances 1127 and 1133 establish the base potential of transistor Q105. At the same time, resistance 1133 provides direct-current and alternating-current negative feedback between the two transistors. Resistance 1131, bridged by capacitance 116, biases the emitter of transistor Q105 and resistance 1132 biases its collector. Transistor Q106 is coupled directly to the collector of transistor Q105. Resistance 1137 bridged by capacitance 119 biases the emitter of transistor Q106 and resistor 1134 serves as a signal source for the noted alternating-current feedback through resistance 1133.

The output transformer T103 is connected to the collector of transistor Q106 and the network consisting of capacitance 118 and resistances 1138, 1139 and 1140 provides an alternating-current impedance of 5.4K ohms in parallel with winding A which impedance is reflected as a terminating impedance of 600 ohms to the output of the voice operated gain adjusting device. The output of transistor Q106 is connected to winding A of transformer T103.

If the output transistor of the main amplifier is driven into cut-off, the NPN-transistor designated as overload detector will be forward biased and operate a circuit directly coupled with the "decrease" keying transistor of the control circuit. Its purpose is to provide fast decreaser action in case of a drastic increase in input level by by-passing the output level integrator as well as the gating circuit. The coupling network consists of an RC-element and a varistor in series with two diodes. It is designed to make the fast decreaser action proportional to the amount of overload of the main amplifier, whereby the diodes prevent interference during normal operation.

Transistor Q107 serves as an overload detector of the amplitude of the signals appearing on transistor Q106. The two transistors Q106 and Q107 are essentially connected in parallel, however, transistor Q107 is of the NPN type while Q106 is of the PNP type. If transistor Q106 is driven into cut-off, transistor Q107 is forward biased and delivers a current into the integrating network consisting of resistances 1135 and 1136, and capacitance 117. Part of this current is fed over wire OC to the control circuit where it causes a fast gain decrease which is proportional to the amount of overload.

In order to achieve a constant output level within close tolerances, a portion of the speech is taken at the output and integrated before it is passed on to the gating circuit. With this method the RMS power at the output can well be approximated and compression of the speech is minimized.

The output level integrator is connected to the primary side of the output transformer and consists of a single stage amplifier driving a temperature compensated full wave rectifier. A potentiometer in the emitter leg of the amplifier controls the gain and permits adjustment of the correct output level. The output of this circuit leads to the decreaser gate where the integrated signal is compared against a reference zener diode.

The signal to operate the output level integrator is derived from the terminating network comprising capacitor 118 and resistance 1138. Resistances 1139 and 1140 establish the base potential of transistor Q108. Resistance 1141 insures the high input impedance of transistor Q108 whereas the potentiometer 1142 in combination with capacitance 120 determines the gain of this stage and sets the dynamic output level of the voice operated gain adjusting device.

The output signal current of transistor Q108 is fed through winding A of T104. The secondary side B of transistor T104 consists of a center-tapped full-wave rectifier consisting of diodes CR110 and CR111, with resistance 1144, and capacitance 121 and 122 performing an integration. Diodes CR108 and CR109 are forward biased by resistance 1143 and serve to temperature-compensate the rectifier as well as the decreaser gate located in the control circuit. The integrated signal is passed over wire DC to the decreaser control gate Q208 of FIG. 3.

The main purpose of the auxiliary amplifier is to provide gain to drive the speech recognition circuit and the signal gate. Its high input impedance is coupled via an automatically adjusted center slicer directly to the input transformer of the gain controlling device. The two diodes of the center slicer are normally forward biased via a temperature compensated network. The amplifier itself consists of two stages with a gain adjustment in the feedback loop which is used to set the minimum input level for which the gain increaser is to operate. The actual threshold is part of the speech recognition circuit.

The center slicer cuts out the center portion of the arriving signal proportionally to the output level of the auxiliary amplifier. Essentially, a portion of the output signal is rectified in the "gain increase delay" section and in turn backward biases the diodes at the input. Thus, for a high speech input level only the peaks are amplified which consist mainly of syllabic modulation. Without a center slicer, the auxiliary amplifier would be driven into overload and thus, the modulation of the output signal would be completely suppressed. Furthermore, after a high input signal condition the backward bias of the diodes will be removed only slowly, thus blocking for a certain period of time any signals at lower levels. The bigger the difference in levels the more time it takes to accept lower level signal and therefore the longer will a gain increase action be delayed. This delay time is necessary to prevent immediate increaser action if speech is mixed with interference signals.

Part of the input signal is fed to the center slicer of the auxiliary amplifier which consists of winding C of T101, diodes CR101, CR103 and winding A of T102. In a "no-speech" condition, the two diodes are slightly forward biased by resistance 1104 and diode CR102 which provides temperature compensation of the center slicer.

The center slicer is controlled by the gain-increase delay circuit consisting of resistance 1106, capacitance 102, and diodes CR104 and CR105, which form a feedback loop around the auxiliary amplifier. A portion of the output signal is fed through the coupling network comprising capacitance 109 and resistance 1112 to the gain increase delay network. There the output signal is rectified and establishes a negative potential at the center tap of T102, which in turn backward biases diodes CR101 and CR103. Thus, only the peaks of the signal can pass, which in case of speech consist mainly of syllabic modulation. If the input signal is suddenly interrupted or drastically decreased, the backward bias of the center slicer is maintained for a short period of time in accordance with the constant determined by resistance 1106 and capacitance 102.

The output of the center slicer (T102, winding B) is fed through capacitance 108 to the input of the auxiliary amplifier. Diodes CR106 and CR107 act as a clipper in case of high input speech level.

The auxiliary amplifier is of a similar structure as the first two stages of the main amplifier. The two stages are direct-current coupled and stabilized through direct current and alternating current negative feedback loops. A direct-current stabilization current is provided from the emitter of transistor Q104 through resistance 1116 to the base of transistor Q103 and at the same time sets the base potential of this transistor. Alternating-current feedback is furnished from the collector of transistor Q104 through resistances 1126 and 1124 and capacitance 114 to the emitter of transistor Q103. The amount of negative feedback can be adjusted with potentiometer 1124 which controls the gain in order to set the threshold for the minimum input level of the voice operated gain adjusting device.

Resistance 1120, bridged by capacitance 112, biases the emitter of transistor Q103, and resistance 1121 couples the alternating-current feedback signal into the emitter of the first stage. Resistance 1115 is the collector resistor of transistor Q103, and resistance 1114 bridged by capacitance 107, forms a RC-filter to decouple the amplifier from the power supply. Capacitance 111 prevents oscillation at higher frequencies.

Figures 2, 3, 4:
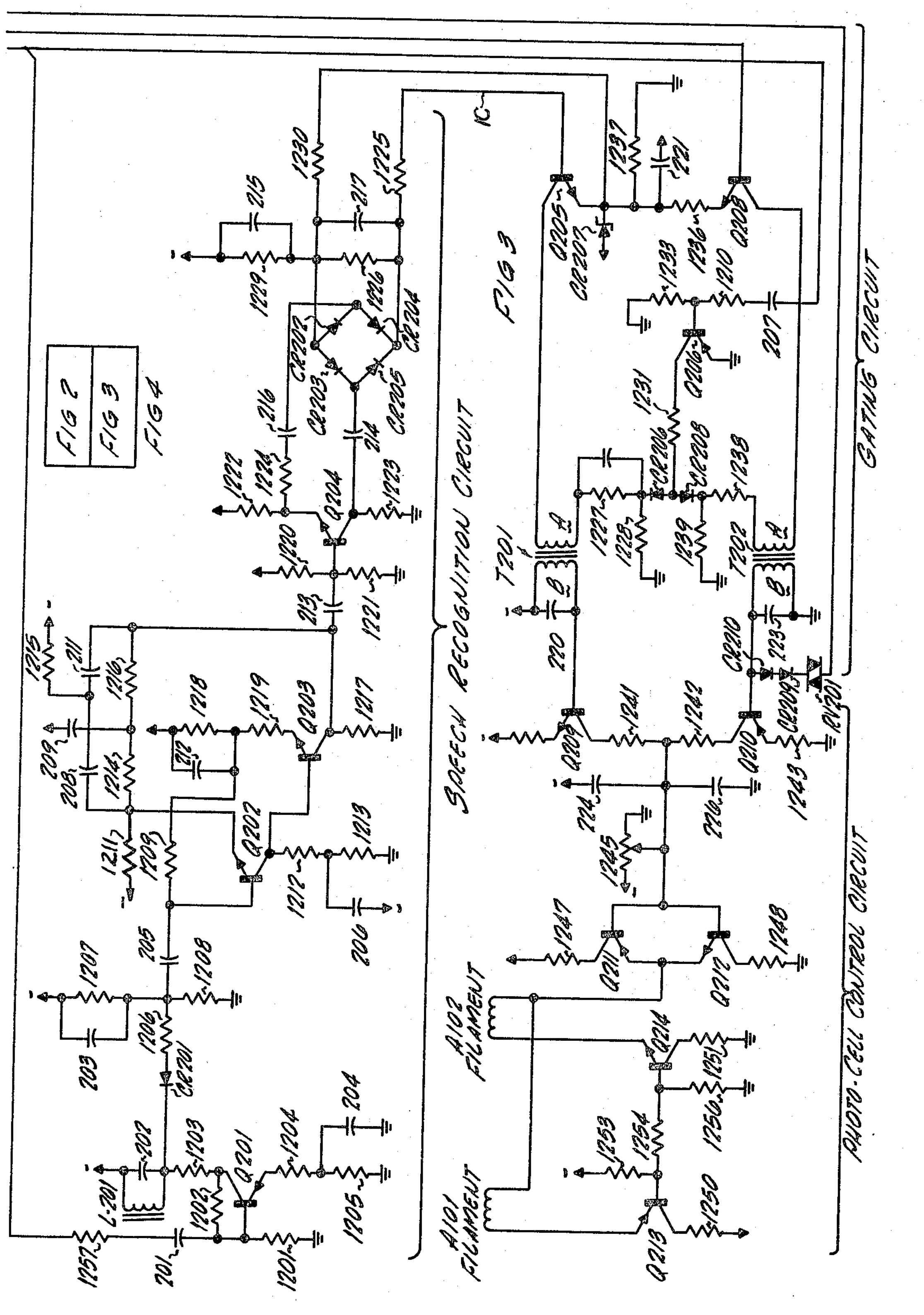
FIG. 4 shows the way in which the sheets of drawings should be arranged in order to be best understood.

Referring now to FIG. 3 of the drawings, a detailed description of the controller circuit will be given.

This part of the circuit is to ensure that only speech is in a position to increase the gain of the gain controlling device. The circuit operates upon the principle that in average speech the 1.2 kc. content is amplitude modulated at a syllabic rate of about 7 c.p.s. Therefore, the circuit is made up of a 1.2 kc. filter, an envelope detector and a selective 7 c.p.s. amplifier which investigate the incoming signals for the above-mentioned criteria. The output of the 7 c.p.s. amplifier is rectified and the obtained D.C.-signal controls the increaser gate of the gating circuit.

The 1.2 kc. filter consists of a tank circuit located in the collector leg of the input transistor. The envelope detector is coupled directly to the tank circuit and basically contains a diode and an integrating capacitor. The diode is slightly forward biased so that for small signals the integration becomes zero. This forward bias represents the actual input threshold which ensures that intelligible crosstalk and other syllabic modulated interference signals at low levels are rejected. If the signal current exceeds the bias current clipping occurs and the envelope can be detected at the integrating capacitor, which is interconnected with the input of the selective 7 c.p.s. amplifier.

The selective 7 c.p.s. amplifier contains two stages with a twin-T network in its overall feedback loop. Thus, the syllabic modulation of speech is amplified and passed on to the rectifier circuit.

The rectifier circuit consists of a special transistor connection which provides a fast build-up of D.C. potential. Its output drives the increaser gate of the gating circuit.

The output signal of the auxiliary amplifier is applied over wire 7 to the speech recognition circuit. Resistance 1257 prevents clipping of the output signal at the auxiliary amplifier in case transistor Q201 is driven into saturation and capacitance 201 serves as a coupling capacitance. Transistor Q201 comprises a single stage amplifier with a tank circuit consisting of L201 and capacitance 202 in its collector branch. The tank circuit is tuned to 1.2 kc. (±5%). Resistances 1201 and 1202 are biasing resistors, the latter providing direct current and alternating current negative feedback. The emitter of transistor Q201 is biased through resistances 1204 and 1205, which set the gain of the stage.

The envelope detector is connected directly across the tank circuit and consists of diode CR201 and the integrating network comprising resistances 1206 and 1207 and capacitance 203. Furthermore a biasing current is fed through resistance 1208 of which a portion passes through resistance 1206 and diode CR201. This bias current insures that the integration at capacitance 203 becomes zero for small signals. Only if the signal is large enough to off-set the bias current completely can an envelope be detected. This effect provides the actual input signal threshold which determines whether or not gain increaser action is to be performed. If an envelope is detected, the signals are applied through capacitance 205 to the input of the selective 7 c.p.s. amplifier.

The selective 7 c.p.s. amplifier consists of two direct-current coupled transistor stages Q202 and Q203. Direct current stabilization is provided through negative feedback current from the emitter of transistor Q203 through resistance 1209 to the base of transistor Q202 which at the same time biases the first stage. Resistance 1213 and capacitance 206 form an RC-filter to prevent undesired feedback through the power supply. Resistance 1212 provides collector potential for transistor Q202 and also sets the bias for transistor Q203. Resistance 1218 bridged by capacitance 212 biases the emitter of transistor Q203 whereby resistance 1219 provides A.C. stabilization. The emitter of transistor Q202 is biased through resistance 1211 which also adds negative A.C. feedback to this stage. The selectivity of the amplifier is obtained by the "twin-T" network in the feedback path between the collector of transistor Q203 and the emitter of transistor Q202. The "twin-T" network consists of resistances 1214, 1215, and 1216, and capacitances 208, 209, and 211. The signal is taken off from the collector resistance 1217 and passed on through capacitance 213 to the speech recognition rectifier circuit.

The speech recognition rectifier circuit operates on the principle of a phase inverter, the output thereof receiving full-wave rectification. This circuit provides a fast building of D.C. potential due to (1) the initial current gain of the transistor, (2) the voltage doubling action of the coupling capacitances 214 and 216 and (3) the full wave rectification performed by diodes CR202, CR203, CR204, and CR205. The rectified signal is smoothed out by the capacitance 217 and resistance 1226. Resistances 1220, 1221, 1222 and 1223 provide proper bias of transistor Q204. Resistance 1224 limits the maximum current delivered to the rectifier and protects the diodes.

The gating circuit receives at its inputs information regarding presence of speech from the speech recognition circuit and the level of the output signal from the output level integrator. In addition, the presence of input signal is checked at the output of the auxiliary amplifier. On the other side, the gating circuit has to pass on proper instructions to the control circuit.

Each of the three inputs of the gating circuit provides a distinct set of information, namely:

*Decreaser gate.*—Correct output level "established" or "not established."

*Increaser gate.*—Incoming signal is "speech" or "not speech."

*Signal gate.*—Input signal "present" or "not present."

It is important to note that the increaser and decreaser gates are D.C. operated, where the signal gate is A.C. operated. Furthermore, the decreaser gate also controls indirectly the diode switch and thus is given priority over the increaser gate. This arrangement eliminates contradictory information to be delivered to the control circuit.

If speech is applied within the range of the voice operated gain adjusting device, the increaser gate closes and the signal gate sends A.C.-pulses to the control circuit effecting gain increase in the main amplifier. If the proper output level is exceeded the decreaser gate switches and leads the signal pulses to the decrease side of the control circuit. Due to the damping of the control circuit by the hang-on capacitors an equilibrium of the control potential will be reached, such that the correct output level is maintained.

Since the increaser gate is operated by the speech recognition circuit a gain increase can only be performed by the presence of speech. In contrast, the gain decreaser takes action for any types of signals as soon as the output level is exceeded.

A zener diode in the emitter of the decreaser gate serves as a reference threshold against which the output level is compared.

The rectified signal is coupled through resistance 1225 directly to the increaser gate transistor Q205 over wire IC. The emitter potential of transistor Q205 is fixed by a zener diode CR207. The potential-divider consisting of resistances 1225, 1226, 1229 and 1230 biases transistor Q205 slightly into cut-off to insure proper turn-off in idle condition. Capacitances 221 and 215 lower the A.C. impedance to prevent any interaction between the increaser gate and the decreaser gate during the operation of the signal gate.

The emitter of the decreaser gate is also biased from the zener diode CR207 in order to provide a threshold for the output signal integrator. The zener diode is forward biased through resistance 1237. Resistance 1236 slightly alters the threshold of the decreaser gate.

In order to understand the operation of the gating circuit it is best to assume that the gating transistors are replaced by switches. The switching action which takes place can then be described as follows:

If the increaser gate Q205 is operated, the D.C. potential between resistances 1227 and 1228 moves from 0 volts to approximately −15 volts and provides a collector potential for the signal gate Q206 across CR206 to resistance 1231. If in addition, the signal gate Q206 operates, A.C. current pulses are sent through resistance 1231, diode CR206, capacitance 219 winding A of transformer T201, transistor Q205, and capacitance 221. These current pulses are reflected to the secondary winding B of transformer T201 and operate the keying transistor Q209.

If the correct output level of the voice operated gain device is established, the decreaser gate will be switched on and the potential between resistances 1238 and 1239 will move from 0 volts to approximately −20 volts. The potential between the diodes will follow and subsequently diode CR206 becomes backward biased. The alternating current pulses from the signal gate are now fed through resistance 1231, diode CR208, resistance 1238, winding A of transformer T202, transistor Q208, resistance 1236 and capacitance 221. As a result thereof, the signal pulses are switched to the secondary winding B of transformer T202 to the decreaser keying transistor Q210.

The control circuit is a hybrid arrangement containing the increaser and decreaser lamp in its center leg. In idle or balanced condition only a small bias current flows through the lamps putting the filament on the verge of being lit.

Normally, both sides of the hybrid are biased to half the supply voltage, one side by means of fixed resistors and the controlling side through a high impedance network with a balance adjustment potentiometer.

The input to the control circuit consists of two keying transistors which are normally turned off. During dynamic operation, however, the keying transistors convert the A.C.-pulses from the gating circuit into positive or negative pulses respectively, which in turn are integrated by the two "hang-on" capacitors. These capacitors are connected to the control side of the hybrid and determine this potential. However, altering this potential from its balanced condition results in turning on either the increaser or decreaser lamp, depending upon the polarity of the change. This in turn regulates the gain of the main amplifier accordingly. During intervals in speech the "hang-on" capacitors will discharge only very slowly through the high impedance network and practically maintain the state of regulation. Only after a relative long period of time (approximately 30 sec.) will the control potential be moved back into idle condition.

The control circuit consists of a hybrid arrangement comprising four transistors, namely, Q211, Q212, Q213 and Q214. The gain increaser and gain decreaser lamp filaments are connected to the center branch of the transistor hybrid. One side of the transistor hybrid is biased with a fixed potential through resistances 1253, 1254, and 1256. The control side of the transistor hybrid is biased in idle condition through potentiometer 1245. The potentiometer 1245 permits balance adjustment. Resistance 1254 forward biases transistors Q213 and Q214 slightly so that a small current is fed to the lamp filaments through resistance 1250, and transistor Q213 and through resistance 1251 and transistor Q214. The output of transistors Q213 and Q214 are fed to the increaser lamp filament and the decreaser lamp filament, respectively. This current puts the lamps on the verge of being lit. However, an additional potential difference of at least half a volt is required before the photocells start to conduct. This idle gap is required to provide stability for the main amplifier during the idle gain period. Resistances 1247, 1248, 1250 and 1251 limit the saturation current of the associated transistors and thus provide protection for these circuits.

The control side of the transistor hybrid is connected to the "hang-on" capacitances 224 and 225.

Upon operating one of the keying transistors, the generated alternating current pulses are integrated by the "hang-on" capacitors and the control potential of the transistor hybrid is shifted accordingly. As a result, the corresponding lamp is turned on whereas the other lamp is fully turned off. This provides the selective gain increaser or gain decreaser action.

Capacitances 220 and 223 reduce transients and improve the switching performance of the keying transistors. Resistances 1240 and 1243 increase the base resistance of the keying transistors and stabilize their gain.

Overload control wire OC associated with the overload detector of the main amplifier delivers a current, under overload conditions, through varister RV201 and diodes CR209 and CR210 directly to the decreaser keying transistor Q210 to effect fast decreaser action. Diodes CR209 and CR210 decouple the overload detector during normal operation, whereas varister RV201 makes the fast decreaser action proportional to the amount of overload.

While the principles of the invention have been described above in connection with specific apparatus and applications, it is to be understood that this description is made only by way of example and not as a limitation on the scope of the invention.

We claim:

1. A voice-controlled automatic gain-adjusting device comprising amplifier means having a predetermined gain for amplifying incoming voice-frequency signals, means responsive to the presence of said voice-frequency signals for generating a signal-present signal, means for detecting the syllabic content of said signals and for generating a gain-increase signal responsive to said detection indicating the presence of speech signals, means responsive to the amplitude of said voice-frequency signals being greater than a predetermined amplitude for generating a gain-decrease signal, first and second variable-loss means selectively operable to respectively decrease and increase the said predetermined gain of said device, and control means operable responsive to the said gain-decrease signal for controlling the said first variable-loss means to reduce the amplification of said incoming signals.

2. A voice-controlled automatic gain-adjusting device as set forth in claim 1 wherein said first and second variable-loss means each comprises a photo-sensitive element having an impedance which varies as a function of intensity of light illuminating said element, and wherein the said operation of said control means controls the said intensity of illumination of each of said elements.

3. A voice-controlled automatic gain-adjusting device comprising amplifier means having a predetermined gain for amplifying incoming voice-frequency signals, means responsive to the presence of said voice-frequency signals for generating a signal-present signal, means for detecting the syllabic content of said signals and for generating a gain-increase signal responsive to said detection indicating the presence of speech signals, means responsive to the amplitude of said voice-frequency signals being greater than a predetermined amplitude for generating a gain-decrease signal, first and second variable-loss means selectively operable to respectively decrease and increase the said predetermined gain of said device, and control means operable responsive to the coincidence of said speech-present signal and said gain-increase signal for controlling the said second variable-loss means to increase the amplification of said incoming signals.

4. A voice-controlled automatic gain-adjusting device comprising amplifier means having a predetermined gain for amplifying incoming voice-frequency signals, means responsive to the presence of said voice-frequency signals for generating a gain-increase signal, means for detecting the syllabic content of said signals and for generating a gain-increase signal responsive to said detection indicating the presence of speech signals, means responsive to the amplitude of said voice-frequency signals being greater than a predetermined amplitude for generating a gain-decrease signal, first and second variable-loss means selectively operable to respectively decrease and increase the said predetermined gain of said device, and control means operable responsive to the said gain-decrease signal for operating the said first variable-loss means to reduce the amplification of said incoming signals and operable responsive to the coincidence of said speech-present signal and said gain-increase signal for operating the said second variable-loss means to increase the amplification of said incoming signals.

5. A voice-controlled automatic gain-adjusting device as set forth in claim 4 wherein means are provided for operating the said first and second variable-loss means on a one-at-a-time basis.

6. A voice-controlled automatic gain-adjusting device as set forth in claim 4 wherein means is provided for giving said gain-decrease signal preference over said gain-increase signal in controlling said control means.

7. A voice-controlled automatic gain-adjusting device as set forth in claim 4 wherein said control means includes a balanced hybrid circuit having the said first and second variable-loss means in the center branch thereof and wherein the said circuit operates corresponding ones of the said variable-loss means.

8. A voice-controlled automatic gain-adjusting device as set forth in claim 7 wherein means is provided for generating an overload signal responsive to the incoming voice-frequency signals exceeding an overload amplitude, and means responsive to said overload signal for unbalancing said hybrid circuit to operate said first variable loss means to reduce the said predetermined gain of said device.

9. A voice-controlled automatic gain-adjusting device comprising amplifier means having a predetermined gain for amplifying incoming voice-frequency signals, means responsive to the presence of said voice-frequency signals for generating a gain-increase signal, means for detecting the syllabic content of said signals and for generating a gain-increase signal responsive to detection of the presence of speech signals in said voice frequency signals, means responsive to the amplitude of said voice-frequency signals being greater than a predetermined amplitude for generating a gain-decrease signal, variable-loss means included in the path of said voice-frequency signals and operable to selectively decrease and increase the amplification of said incoming voice-frequency signals, control means operable responsive to the said gain-decrease signal for generating control signals for operating the said variable-loss means to decrease the amplification of said incoming signals, and means for isolating the said control signals from the said voice-frequency signal path.

10. A voice-controlled automatic gain-adjusting device comprising amplifier means having a predetermined gain for amplifying incoming voice-frequency signals, means responsive to the presence of said voice-frequency signals for generating a signal-present signal, means for detecting the syllabic content of said signals and for generating a gain-increase signal responsive to detection of the presence of speech signals in said voice-frequency signals, means responsive to the amplitude of said voice-frequency signals being greater than a predetermined amplitude for generating a gain-decrease signal, variable loss means included in the path of said voice-frequency signals and operable to selectively decrease and increase the amplification of said incoming voice frequency signals, control means operable responsive to the coincidence of said speech-present signal and said gain-increase signal for generating control signals for operating the said variable-loss means to increase the amplification of said incoming signals, and means for isolating the said control signals from the said voice-frequency signal path.

11. A voice-controlled automatic gain-adjusting device as set forth in claim 10 wherein the said operation of the variable-loss means responsive to said control signals is substantially instantaneous and wherein means is provided for delaying the return of said variable-loss means to its unoperated condition responsive to the cessation of speech signals in said incoming voice frequency signals.

12. In a voice-controlled automatic gain-adjusting device for amplifying incoming voice-frequency signals, means for detecting the syllabic content of said signals and for generating a gain-increase signal responsive to detection of the presence of speech signals in said incoming signals, the said detecting means including means for selecting the amplitude peaks of said incoming voice-frequency signals, for selecting and rectifying a predetermined range of frequencies of said peak signals, and for passing the rectified signals having a syllabic rate of speech.

13. A voice-controlled automatic gain-adjusting device as set forth in claim 12 wherein said means for selecting the amplitude peaks of said incoming voice-frequency signals includes means for selecting only those signal peaks in excess of a predetermined amplitude.

14. A voice-controlled automatic gain-adjusting device as set forth in claim 13 wherein amplitude-controlling means are provided for varying the said predetermined amplitude in accordance with the average amplitude of said incoming voice frequency signals.

15. A voice-controlled automatic gain-adjusting device as set forth in claim 14 wherein delay means is provided for disabling the said amplitude-controlling means for a predetermined number of speech syllables following any substantial change in the amplitude of said incoming voice frequency signals.

16. A voice-controlled automatic gain-adjusting device as set forth in claim 15 wherein said amplitude controlling means includes unidirectional current device biased to pass a current of a predetermined value.

17. A voice-controlled automatic gain-adjusting device as set forth in claim 16 wherein said delay means includes means for varying the bias on said unidirectional devices.

References Cited by the Examiner

K. W. Jarvis: "The Vocon—A Synthesized Control for Speech Level," The Automatic Electric Technical Journal, vol. 3, No. 2, pp. 55–62, April 1952.

KATHLEEN H. CLAFFY, *Primary Examiner.*

R. MURRAY, *Assistant Examiner.*